United States Patent [19]

Nelson, Jr.

[11] Patent Number: 4,711,718

[45] Date of Patent: Dec. 8, 1987

[54] ION-SELECTIVE WATER FILTER

[75] Inventor: Sidney G. Nelson, Jr., Hudson, Ohio

[73] Assignee: Sanitech, Inc., Twinsburg, Ohio

[21] Appl. No.: 5,215

[22] Filed: Jan. 20, 1987

[51] Int. Cl.[4] .............................................. B01D 27/02
[52] U.S. Cl. .................................... 210/282; 210/449;
210/688
[58] Field of Search ............... 210/688, 263, 282, 449,
210/502.1, 504, 506

[56] References Cited

U.S. PATENT DOCUMENTS

| 3,208,595 | 9/1965 | Butler | 210/449 |
| 4,096,064 | 6/1978 | du Fresne | 210/282 |
| 4,585,559 | 4/1986 | De Voe | 210/688 |

Primary Examiner—Ivars Cintins

[57] ABSTRACT

A filter is disclosed for treating drinking waters contaminated with lead or, alternately, lead and copper. The filter is made an effective extractor of toxic lead or copper by incorporating a particulate chelating agent having substantial selectivity for lead or lead and copper and having little or no reactivity with all other ions.

2 Claims, 3 Drawing Figures

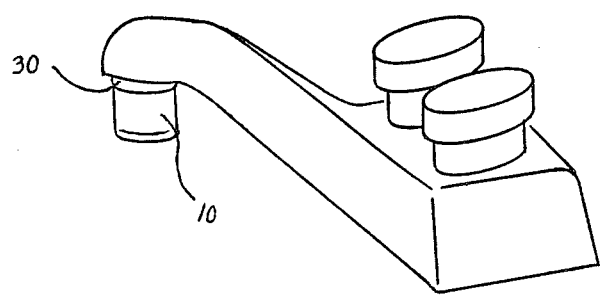
Fig 2.
Fig 3.
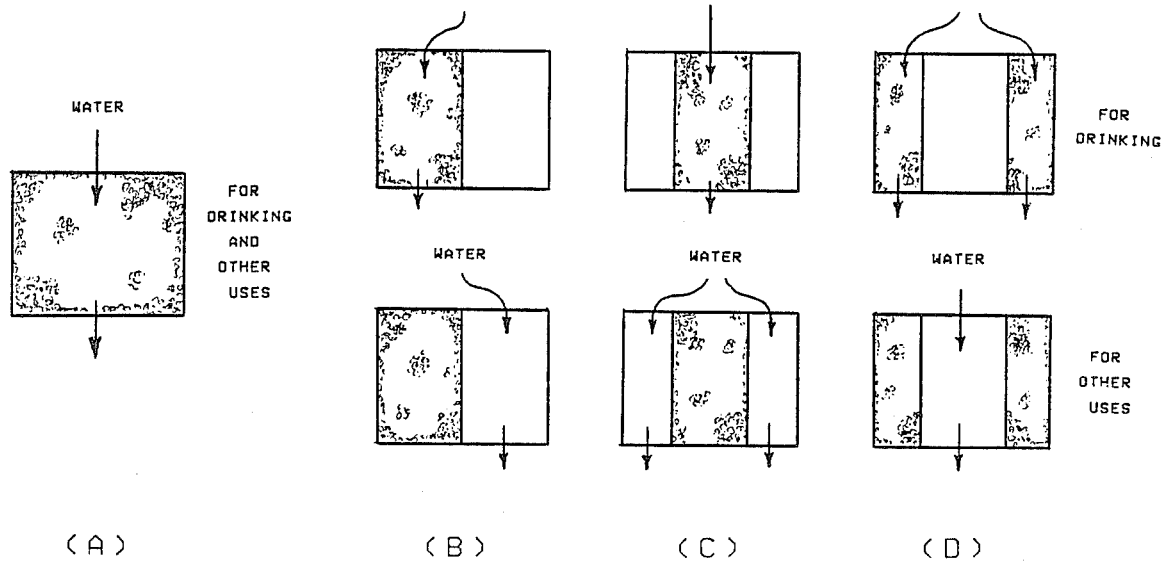

4,711,718

ION-SELECTIVE WATER FILTER

TECHNICAL FIELD

This invention relates to water filters and more particularly to selective filters for drinking water taps, especially in households and institutions.

BACKGROUND OF THE INVENTION

Growing evidence indicates that heavy metals leached into drinking water are an extremely serious and widespread environmental health hazard. The high toxicity of lead has long been known, but recent statistical medical studies have shown that even the smallest concentrations of lead in the body can cause serious health problems. Low-level lead exposure has been implicated in effecting fetal development (causing neurological, mental, and physical disabilities), in retarding the cognitive development of children, and in contributing to hypertension, heart attacks, and strokes in middle-aged men. In its report, "Reducing Lead in Drinking Water: A Benefit Analysis" (EPA-230-09-86-019; December, 1986), the Environmental Protection Agency (EPA) conservatively estimated that a billion dollars in annual monetized benefits would result from reducing exposure to lead in drinking water from 50 mg/l to 20 mg/l. Many people believe that zero lead is the ideal level.

High levels of tap water lead are found nationwide. It is especially a problem in areas with water of low to medium pH, with soft water, or with public water systems that contain sections of lead piping. In new homes, and those with new pipework solder, it is not uncommon to find first-draw water which contains lead in concentrations many times the EPA's current maximum contaminant level (MCL). Also, the leaching of copper ions from piping is a problem in some areas.

Many filters have been made to treat waters used in the home. Some have been designed to attach to the end of a water faucet or to place in the line just upstream of the tap. Some have replaceable and even regenerable elements; others are disposable. Many filters are used to remove hardness (calcium carbonates) from water. Other filters are used to remove unpleasant tastes or objectional colors in water. The filter of the invention is designed to remove toxic heavy metals, and, in particular, lead and copper from drinking waters. Moreover, the filter will, unlike conventional resin filters, selectively remove lead and copper ions and allow all other cations to pass through. This special ability gives the new filter long life before saturation occurs and therefore means that the filter can be relatively small and can be used effectively for a long time before requiring replacement.

DISCLOSURE OF THE INVENTION

This invention is an improvement in a water purifying filter adapted for connection to a water faucet, said filter comprising a granular bed of special water purifying medium enclosed in a vessel that is readily attachable to a faucet. The water purifying medium comprises a chelating agent having substantial selectivity for one or more toxic metals, and more specifically, for lead and copper, with said agent preferably appearing as a coating attached to small, hard particles, such as silica. A modified synthetic catechol siderophore specific for lead or one specific for lead and copper typify such useful chelating agents.

BRIEF DESCRIPTION OF THE DRAWINGS

FIG. 2 shows the ion-selective filter attached to a conventional water faucet.

FIG. 3 shows cross-sectional views of different variations of the same water filter.

DETAILED DESCRIPTION OF THE INVENTION

Figure 1:
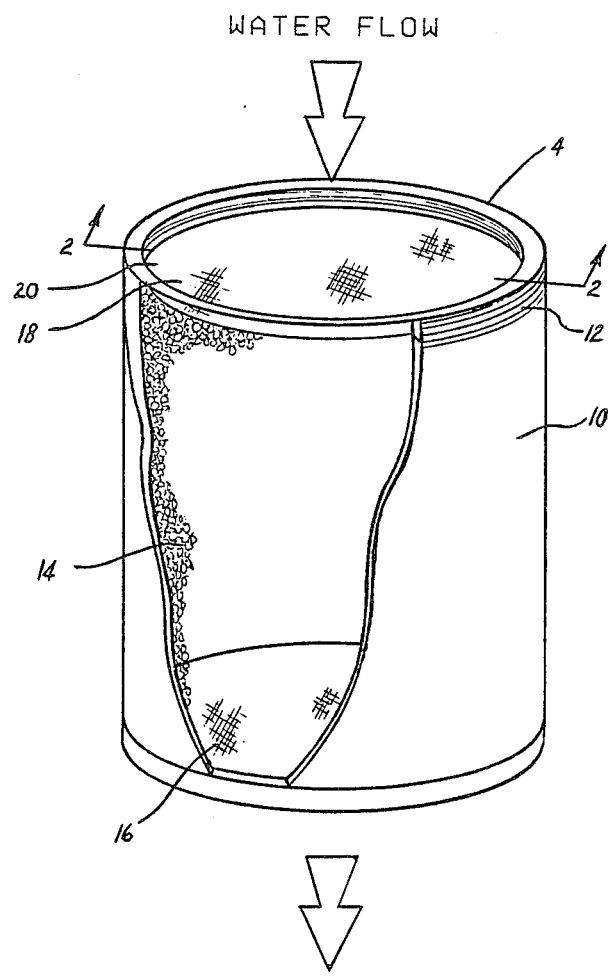
FIG. 1 is a top perspective view of a typical ion-selective water filter of the invention with a cut-away section showing its internal structure.

A chelating agent found to be selective in removing lead ions or lead and copper ions from drinking waters is a synthetic catechol siderophore, and more specifically a catechol siderophore modified by substituting a bromine, chloride or nitrogen oxide ion in the benzene-ring structure of the catechol. Such modifications can be accomplished by reacting catechol siderophore with bromine, sodium hypochlorite or sodium nitrite. It has been found advantageous for the removal of lead and/or copper ions from aqueous solutions to employ the modified catechols as coatings on hard silica chips or spheres. The base silica particles provide a bed that is stable dimensionally, that is free flowing, and that is mechanical strong and abrasion resistant.

In FIG. 1 filter 4 comprises a hollow metal or plastic cylinder 10 with upper male screw threads 12 for attachment to the discharge end of a drinking water faucet. A bed 14 of solid particles that will selectively react with and hold toxic metal ions present in water, and preferably of modified catechol siderophore-coated silica particles, fills the cavity inside the hollow cylinder 10. The sizes of the particles range from about 75 microns (Tyler 200 mesh size) to 1981 microns (Tyler 9 mesh size) in their largest dimension, and preferably within the range 300 microns (Tyler 48 mesh size) to about 1600 microns (Tyler 10 mesh size).

A perforated plate or screen 16 permanently affixed to the bottom of cylinder 10 supports the particle bed 14 and together with the cylinder walls and a similar plate or screen 18 permanently affixed to the top of cylinder 10 completely encloses and contains the bed. The size of the perforations in the plates or screens is 75 microns or less, and the number of perforations are large enough to allow water flow rates through the filter of ¾ gallon per minute or more.

FIG. 2 shows a typical application of the filter of the invention. The filter 10 can be attached directly to the water faucet outlet 30 by screwing the external threads of the filter into internal threads of the water faucet. For faucet outlets having external threads, an adaptor can be employed. Such adaptors are common in the trade and generally consist of a metal or plastic ring having both internal and external threads. Such an adaptor performs as a conduit between the faucet outlet and the filter.

Variations of the invention are shown in FIG. 3. For applications where water exiting the faucet is used mainly for personal consumption, Variation A is preferred. However, for applications where water exiting the faucet is used for multiple purposes, such as washing hands, washing dishes, and drinking, it may be desirable to secure the toxic metal removal properties of the filter during drinking uses but not during other uses. In such cases, the water stream is diverted from the particle bed during non-drinking times. Referring to FIG. 1, the space 20 above the upper plate or screen 18 of the filter may be left open, as in the case of Variation A, or may be filled with a structure that permits one to direct the flow of water downward in different directions, as shown in Variations B, C, and D.

It will be apparent to one skilled in the art that the water filter of the invention may be constructed in many ways. The embodiments illustrated are merely examples of typical ion-selective water filters. All water filters specifically directed to drinking waters which utilize a chelating agent that selectively removes lead and/or copper ions while allowing all other ions to pass through undisturbed are contemplated within the scope of the invention.

The following example demonstrates the preparation and use of a typical selective-ion water filter of the invention.

EXAMPLE

Several ion-selective water filters were prepared by cutting one to four inch sections of polypropylene tubing having an inside diameter of 0.75 inches and a 0.05 inch wall, threading one end of each section and cementing circular metal screens having an opening size of 100 microns to each opposite end. The units were filled with 3 to 30 grams of specially-prepared modified siderophore catechols bonded onto angular silica particles, about 200 to 1600 microns in size. A second metal screen was then placed over the bed of each filter and was secured in place. The completed filters were attached to conventional water faucets on lines leading from large tanks of tap water with known concentrations of lead. Waters were allowed to flow through the filters during which times the lead levels of the outgoing waters were monitored. The results of the trials, listed in Table 1, indicate the effectiveness of the filters in removing lead. In all cases, incoming waters possessed lead levels considered highly dangerous, while exiting waters had reduced lead levels. The projected life of the filters was one to three years.

TABLE 1

| Filter | Filter Bed Weight (g) | Water Flow Rate (GPM) | Lead Level of Incoming Water | Lead Level After Filtration | Removal Efficiency |
|---|---|---|---|---|---|
| A | 30 | <0.25 | 15,000 ppb | 5 ppb | 99+% |
| B | 30 | 0.25 | 95 ppb | 45 ppb | 55% |
| C | 3 | 0.25 | 95 ppb | 25 ppb | 70% |
| C | 3 | 1.00 | 95 ppb | 75 ppb | 21% |
| D | 3 | 0.15 | 95 ppb | 6 ppb | 94% |

What is claimed:

1. A device for removing dissolved lead and copper ions from drinking water consisting of a vessel that attaches to the outlet section of a water dispensing faucet; a bed containing catechol siderophore modified by substituting bromine, chloride or nitrogen oxide in the benzene ring of the catechol that selectively removes and absorbs lead and copper ions from waters passing through it; and porous support means for holding said bed in place in said vessel and for allowing water to flow through the bed.

2. A device for removing dissolved lead and copper ions from drinking water consisting of a containing vessel that attaches to the outlet section of a water dispensing faucet; a granular bed of catechol siderophore modified by substituting bromine, chloride or nitrogen oxide in the benzene ring of the catechol and chemically attached to silica particles that selectively removes and absorbs lead and copper ions from water when water is passed through said bed; and separate top and bottom porous support means for holding said filter bed in place in said containing vessel and allowing said drinking water to pass through said filter bed and exit said device.

* * * * *